United States Patent
Weinman, Jr.

(10) Patent No.: US 8,510,299 B2
(45) Date of Patent: Aug. 13, 2013

(54) METHOD AND APPARATUS FOR PROVIDING A USER TRAFFIC WEIGHTED SEARCH

(75) Inventor: Joseph B. Weinman, Jr., Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 297 days.

(21) Appl. No.: 11/877,374

(22) Filed: Oct. 23, 2007

(65) Prior Publication Data

US 2009/0106228 A1    Apr. 23, 2009

(51) Int. Cl.
*G06F 7/00*        (2006.01)
*G06F 17/30*       (2006.01)

(52) U.S. Cl.
USPC .......................................................... 707/732

(58) Field of Classification Search
None
See application file for complete search history.

(56) References Cited

U.S. PATENT DOCUMENTS

| | | | | |
|---|---|---|---|---|
| 6,606,657 | B1 * | 8/2003 | Zilberstein et al. | 709/224 |
| 6,760,312 | B1 * | 7/2004 | Hitzeman | 370/252 |
| 7,499,919 | B2 * | 3/2009 | Meyerzon et al. | 1/1 |
| 7,565,157 | B1 * | 7/2009 | Ortega et al. | 455/456.2 |
| 7,640,232 | B2 * | 12/2009 | Fish et al. | 1/1 |
| 8,010,523 | B2 * | 8/2011 | Djabarov | 707/721 |
| 2002/0078045 | A1 * | 6/2002 | Dutta | 707/7 |
| 2003/0115121 | A1 * | 6/2003 | Bremner et al. | 705/35 |
| 2007/0088690 | A1 * | 4/2007 | Wiggen et al. | 707/5 |
| 2007/0203898 | A1 * | 8/2007 | Carmona | 707/4 |
| 2007/0255629 | A1 * | 11/2007 | Tillman | 705/26 |
| 2007/0255639 | A1 * | 11/2007 | Seifert | 705/36 R |
| 2007/0255754 | A1 * | 11/2007 | Gheel | 707/104.1 |
| 2008/0059446 | A1 * | 3/2008 | Blass et al. | 707/5 |
| 2008/0109435 | A1 * | 5/2008 | Stephens | 707/7 |
| 2008/0228776 | A1 * | 9/2008 | Weiss et al. | 707/10 |

\* cited by examiner

*Primary Examiner* — Uyen Le

(57) ABSTRACT

A method and apparatus for providing a user traffic weighted search in a network are disclosed. For example, the method receives a query from a customer and determines whether the customer has opted-in for a service for traffic data monitoring. The method then provides one or more search results to the customer in response to the query, where the one or more search results are prioritized in accordance with collected user usage data if the customer has opted-in for the service for traffic data monitoring.

18 Claims, 3 Drawing Sheets

METHOD AND APPARATUS FOR PROVIDING A USER TRAFFIC WEIGHTED SEARCH

The present invention relates generally to communication networks and, more particularly, to a method for providing policy based traffic weighted search in networks, e.g., a public network such as the Internet or a private network such as an enterprise Intranet.

BACKGROUND OF THE INVENTION

The World Wide Web is a network of computers and information resources, typically with some information resources referring to other information sources via hyperlinks. For example, text or images can be encoded such that they refer to a network address (e.g., an URL, or Uniform Resource Locator) of other information resources.

The World Wide Web has grown explosively over the last few years to become a very large scale, distributed, evolving repository of information resources. Unfortunately, with this growth has come increased difficulty in identifying relevant information resources. To address this need, search engines have become a core capability of the Internet. For example, in performing a search, an Internet user may enter a word, a phrase, or a set of keywords into a web browser software, or a thin client toolbar running on the user's computer. The search engine, specifically its query processor, may find matching information resources, such as web pages, images, documents, videos, and so on, and provide a response to the user. Search engines have also become prevalent in Intranets, i.e., private enterprise networks, where keywords are used by such search engines to locate documents and files.

Unfortunately, as the available information has grown, the results returned by search engines have also grown. For example, a search on the words "white" and "house" on a popular search engine may return about three hundred million pages. In practical terms, since no user wants in a reasonable amount of time to investigate hundreds of web pages, much less hundreds of millions of pages, such search results are not very effective.

To attempt to resolve this dilemma, search engines attempt to rank search results by "relevance", e.g., ranking those resources most likely to help the searching user as more relevant. In turn, "more relevant" resources are often returned first to the user as an initial set of search results.

To determine relevance, a number of approaches have been used. One popular approach, the PageRank algorithm used by Google, Inc., of Mountain View Calif., awarded to Larry Page in U.S. Pat. No. 6,285,999, is to attempt to determine the relevance of an information resource by considering how many referring documents have hyperlinks to the information source. The core idea of this approach, in effect, is that more "valuable" information resources will have a greater number of other information resources that are hyperlinked to them. A number of enhancements have been made to this approach. For example, it can be made recursive, so that the higher the value of the information resources that refer to an information resource, the higher the value of that information resources. That is, votes "in favor" of a given page (that is, hyperlinks to that page) by pages that are themselves "important" are counted more and therefore make that page more important.

Another enhancement is to minimize the weight of internal cycles of links from a web site. The reason is that a web site designer can deceptively affect the relevance of a web site, e.g., one could create a web site with a million pages, all of which refer to a particular home page. This approach may artificially create the impression that the particular home page is very important.

One problem with the various approaches above is that the weighting does not in fact rank web pages higher based on user relevance, but rather on how many web page designers happen to know about the ranked information resource and include such a link at the time that their web page is designed. In effect, it is like trying to determine how busy a traffic intersection is at rush hour by asking the traffic engineer who designed the road or by counting how many "important" highways are connected to the road rather than actually looking at the traffic at the actual intersection.

SUMMARY OF THE INVENTION

In one embodiment, the present invention discloses a method and apparatus for providing a user traffic weighted search in a network. For example, the method receives a query from a customer and determines whether the customer has opted-in for a service for traffic data monitoring. The method then provides one or more search results to the customer in response to the query, where the one or more search results are prioritized in accordance with collected user usage data if the customer has opted-in for the service for traffic data monitoring.

In one embodiment, a method receives a query from a user. The method then provides one or more search results to the user in response to the query, where the one or more search results are prioritized in accordance with collected user usage data derived from at least one of: a plurality of other users other than said user who have provided a first preference associated with opting-in for traffic data monitoring or a plurality of content providers who have provided a second preference associated with opting-in for traffic data monitoring.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
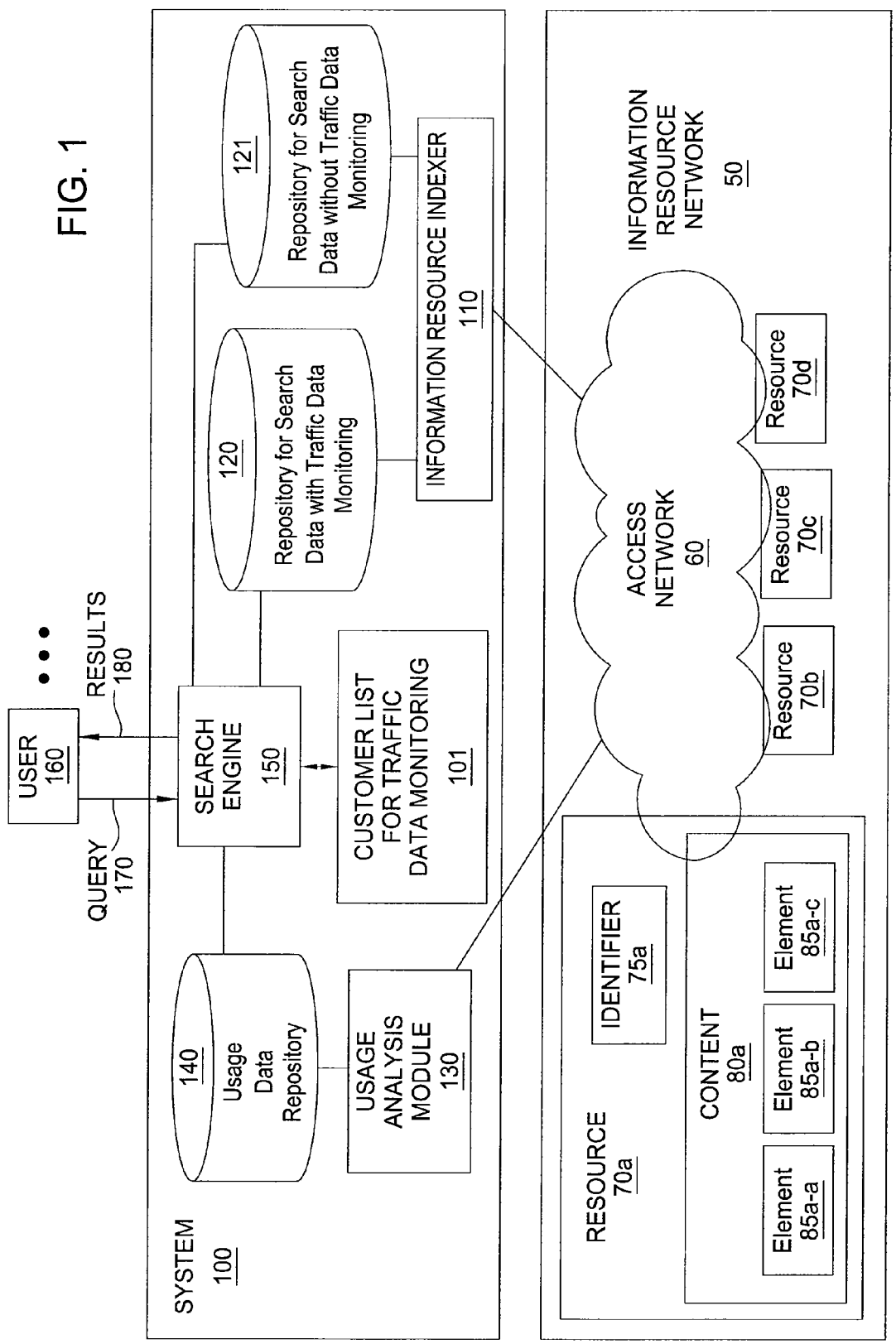
FIG. 1 illustrates an embodiment of a system of the present invention for use in combination with an information resource network and user.

The present invention broadly discloses a method and apparatus for providing policy based traffic weighted search in networks, e.g., a public network such as the Internet or a private network such as an enterprise Intranet. FIG. 1 illustrates an illustrative embodiment of a system 100 of the present invention for use in combination with an information resource network 50 and one or more users 160.

In one embodiment, the information resource network 50 may comprise an access and transport network 60 (such as the Internet, an enterprise Intranet, or any other type of network, including routers, switches, multiplexers, transport facilities, and other components as are known in the art) and one or more information resources 70x (e.g., shown in FIG. 1 as 70a, 70b, 70c, and 70d). Each of the information resources may have a storage for storing web pages, images, videos, animations, music clips, documents, files, audio files or any other information resource as is known in the art. Each information resource 70 comprises a resource address or broadly a resource identifier 75 (e.g., shown in FIG. 1 as 75a), such as a URL, e.g., "http://www.uspto.gov/" that can be used to locate and access the information stored in a particular information resource.

Each information resource may have one or more types of stored content 80a-n (broadly referred to as content 80) that can be accessed and retrieved in response to a query. In one embodiment, the content comprises text information (broadly comprising alphanumeric characters). Although the present invention is disclosed below using text information as an example, those skilled in the art will realize that the present invention is not so limited. Namely, the stored content may comprise web pages, images, videos, animations, music clips, documents, files, audio files and the like.

For example, the text information may comprise actual text, e.g., "Welcome to the United States Patent and Trademark Office . . . " In one embodiment, each content 80 may contain a plurality of content elements 85a-n which can be derived from the content 80. For example, if content 80 is "Welcome to the United States Patent and Trademark Office", then content elements 851 may comprise the words "Welcome", "to", "the", "United", "States", "Patent", "and", "Trademark,", and finally the word "Office". In FIG. 1, these content elements are shown for information resource 70a as content element 85a-n, e.g., content element 85a-a, content element 85a-b, and so forth. It should be noted that the present invention is not limited by the number of types of content or the number of content elements for each content that can be stored in each information resource 70.

In one embodiment, the system 100 may comprise an information resource indexer 110, a search engine 150, a customer list for traffic data monitoring 101, a usage data repository 140, a usage analysis module 130, a repository of search data with traffic data monitoring 120, and a repository of search data without traffic data monitoring 121. The information resource indexer 110 acquires data from information resource network 50 and stores, e.g., search data with traffic data monitoring in the repository 120 and search data without traffic data monitoring in the repository 121. That is, one repository is used for customers with traffic data monitoring and the other repository is used for customers without traffic data monitoring.

In one embodiment, search data with traffic data monitoring provides a mapping between content elements 85 of each information resource 70x to its identifier 75. For example, the repository for search data 120 may contain the information shown in Table 1, as a non-limiting illustrative example.

TABLE 1

| | |
|---|---|
| and | http://www.uspto.gov/index.html |
| Office | http://www.officesupplies.com |
| | http://www.uspto.gov/index.html |
| Patent | http://www.shoes.com/catalog/patent_leather.html |
| | http://www.uspto.gov/index.html |
| | http://www.uspto.gov/patft/index.html |
| States | http://www.uspto.gov/index.html |
| Trademark | http://www.uspto.gov/index.html |

TABLE 1-continued

| | |
|---|---|
| United | http://www.unitedairlines.com/index.html |
| | http://www.uspto.gov/index.html |
| Welcome | http://www.uspto.gov/index.html |

Referring to Table 1, it will be appreciated that each content element 85 may be associated with one or more identifiers 75 in the information resource network 50. For example, as shown in Table 1, the content element "Patent" may appear not only on one or more pages at the USPTO web site such as index.html and patft/index.html, but also at a site selling shoes, specifically patent leather. In general, a given content element 85 may be associated with multiple identifiers 75 and a given identifier 75 may be associated with multiple content elements 85.

In one embodiment, usage analysis module 130 (broadly a traffic data monitor) monitors actual network traffic in information resource network 50. For example, this can include packet flow information (such as source IP address, destination IP address, number of packets, and the like), transport layer information (such as regarding Transmission Control Protocol (TCP) connection establishment, source port, destination port, and connection termination), or application layer information (such as Hypertext Transfer Protocol (HTTP) GETS or File Transfer Protocol (FTP) RETRIEVES). In practice, data may be acquired in a variety of ways. For example, routers from a router vendor, e.g. CISCO, Inc., of San Jose, Calif., may provide a capability called NetFlow for collecting data on volumes of packets sent, their source, destination, port number and the like.

Usage analysis module 130 maintains the acquired usage data in usage data repository 140. For example, usage data repository 140 may contain the following illustrative information, shown in Table 2.

TABLE 2

| SITE/PAGE | #VISITORS | AVG TIME (SECS) | PAGE VIEWS/ HOUR |
|---|---|---|---|
| http://www.officesupplies.com/ | 1,320,247 | 27.225 | 7,465 |
| http://www.shoes.com/ | 322,460 | 32.665 | 1,354 |
| /catalog/patent_leather.html | 1,325 | 17.554 | 73 |
| http://www.uspto.gov/ | 7,273,433 | 372.033 | 20,665 |
| /index.html | 7,273,433 | 17.251 | 17,335 |
| /patft/index.html | 3,255,991 | 27.773 | 12,744 |
| /trademarks.html | 1,233,577 | 43.873 | 6,351 |
| http://www.unitedairlines.com/ | 8,375,269 | 46.264 | 19,422 |
| /index.html | 8,375,269 | 30.290 | 12,433 |
| /flightstatus.html | 3,471,023 | 55.221 | 17,391 |
| /reservations.html | 1,233,064 | 22.699 | 13,912 |

The usage data shown in Table 2 is intended to be exemplary and should not be interpreted as limiting the present invention. For example, Table 2 may contain a very large number of entries, one for each page and/or site which may be visited. It may also contain additional columns, with each column based on a particular usage statistic which may be collected. Such usage statistics can be collected by the network that is providing access to the resources listed in Table 2. It should be noted that the collected data may be based on statistical sampling of the actual data. The stored data may be raw statistical data, or may be entered pre-processed. Such processing may be conducted, e.g., to weight usage data based on a freshness parameter, e.g., where more recent usage data (e.g., data collected within the last two weeks, and the like) is weighted more heavily over older usage data (e.g., data collected greater than 3 months ago, and the like).

It should be noted that U.S. patent application Ser. No. 11/293,445 filed on Dec. 2, 2005 provides an illustrative method and system for ranking web page relevance based on actual use of the web page by users rather than references to the web page by web page designers. However, it should be noted that any other method and system for ranking web page relevance based on actual use of the web page by users can be adapted to the present invention.

In operation, a user 160 may interact with the search engine 150, by providing a query 170 for which search engine 150 returns results 180. In one embodiment, the search engine 150 interacts with a customer list for traffic data monitoring 101 and determines whether or not the customer opted-in for traffic data monitoring. More specifically, the customer list for traffic data monitoring 101 may contain a list of customers who have agreed that their traffic data (e.g., monitoring the customers' general resource accessing activities (e.g., accessing various web sites), monitoring the customers' search queries and the customers' responses to the returned results, and the like) can be monitored for generating the usage data as illustrated in Table 2 above. Thus, such customers can be perceived as having "opted-in" for the service of traffic data monitoring. It should be noted that by opting-in, in one embodiment the customers are agreeing to their overall network traffic being monitored across the network and such traffic data are not limited to a particular web site or web page. However, it should be noted that in an alternate embodiment, the customers may selectively opt-in for outgoing traffic monitoring and/or for incoming traffic monitoring.

Similarly, a customer may also "opt-out" of the service of traffic data monitoring. If a customer has opted-out of the service of traffic data monitoring, their overall network traffic will not be monitored. Namely, the list may include a list of customers who have specified that their traffic data (e.g., their search queries and the customers' responses to the returned results) cannot be monitored for generating the usage data as illustrated in Table 2 above.

The premise of opting into the service is to allow the network to have the ability to collect user usage data that can then be used to better refine search results, e.g., using the various user usage statistics as one or more weighting parameters to provide more accurate search results. Since user usage data is the best measure of relevance, collecting the user usage data is necessary to increase the accuracy of the returned results. However, for privacy reasons, some customers may decide that such monitoring of their traffic is simply too intrusive. In such situations, the customer is provided with the option to opt-out of the service.

In one embodiment, users who have opted-in to the service will benefit by having the collected user usage data be applied to refine search results that will be returned in response to the users' queries. In one embodiment, users who have opted-out of the service will not benefit by having the collected user usage data be applied to refine search results that will be returned in response to the users' queries. As such, customers who have opted out will retain their privacy at the expense that their search results may have less relevance.

Alternatively, in one embodiment, users who have opted-out of the service may still benefit by having the collected user usage data (of users who have opted-in to the service) be applied to refine search results that will be returned in response to the users' queries. As such, an "opted-out" user may still benefit from usage data provided by other users. However, to encourage users to allow the network to gather the user usage data, the network service provider may provide "opted-in" users the refined search results free of charge (or at a significantly reduced rate), whereas the network service provider may provide "opted-out" users the refined search results only for a charge (or at a higher rate). For example, the network service provider may provide "opted-in" users with other incentives, such as having other services being provided free of charge (e.g., offering a number of free conference calls per month), having a higher bandwidth assigned to searches, providing a higher quality of service, providing a discount on other services (e.g., reducing cost of VoIP services or Internet access services) and the like. Broadly defined, the customer is provided a financial incentive, a performance incentive and/or a service incentive.

To illustrate, the search engine 150 parses the query 170 into one or more content elements and other query elements such as Boolean operators such as AND, OR, and NOT, and identifies matching information resources 70 that meet the search criteria. For example, if a query 170 comprises the search term "patent", then information resources 70 having identifiers of "http://www.uspto.gov/index.html", "http://www.uspto.gov/patft/index.html", and "http://www.shoes.com/catalog/patent_leather.html" will be returned as search results 180. In one embodiment, if the customer has opted-in for traffic data monitoring, search engine 150 then returns these results by accessing the search data with traffic data monitoring from the repository 120, which is prioritized in accordance with usage data maintained in usage data repository 140. In other words, the usage data stored in the repository 140 is used for ranking the search data returned from the repository 120. If the customer opted-out of traffic data monitoring, then search engine 150 returns results by accessing the search data without traffic data monitoring from the repository 121. It should be noted that although the system 100 illustrates the use of two different repositories 120 and 121, the present invention is not so limited. Namely, one repository can be employed to store both sets of data.

Optionally and advantageously, query 170 may comprise not only key terms, e.g., keywords, but also desired relative weighting of usage data (e.g., broadly, the query may include one or more usage parameters: e.g., average time a user spent at a site, the number of users visiting the site, the rate the site is being accessed, and so on). For example, query 170 might specify "KEYWORDS: patent, USAGE CRITERION WEIGHTINGS: (TCP Connection Time: 70%), (Number Unique Visitors, 30%)" indicating that relatively greater weight should be given to the time spent on the site but also the number of unique visitors should be considered. For example, the returned search results should only include sites where the average time a user spent on the site is ranked at 70% or greater, or where at least 30% of the visitors to a site must be unique or different visitors. This example query will eliminate sites where most visitors do not spend a great deal of time or sites where most of the visitors are the same visitors. It will be appreciated that there are many mechanisms for posting a query together with weighting criteria or parameters, e.g., a plain text hybrid query, XML (extensible markup language), checkboxes with various weighting options, etc.

Those skilled in the art will realize that the communication system 100 may be expanded by including additional access networks, network elements, data networks, search engines, analysis systems, etc. without altering the present invention. As such, the illustrative example of FIG. 1 is not intended to limit the present invention.

Figure 2:
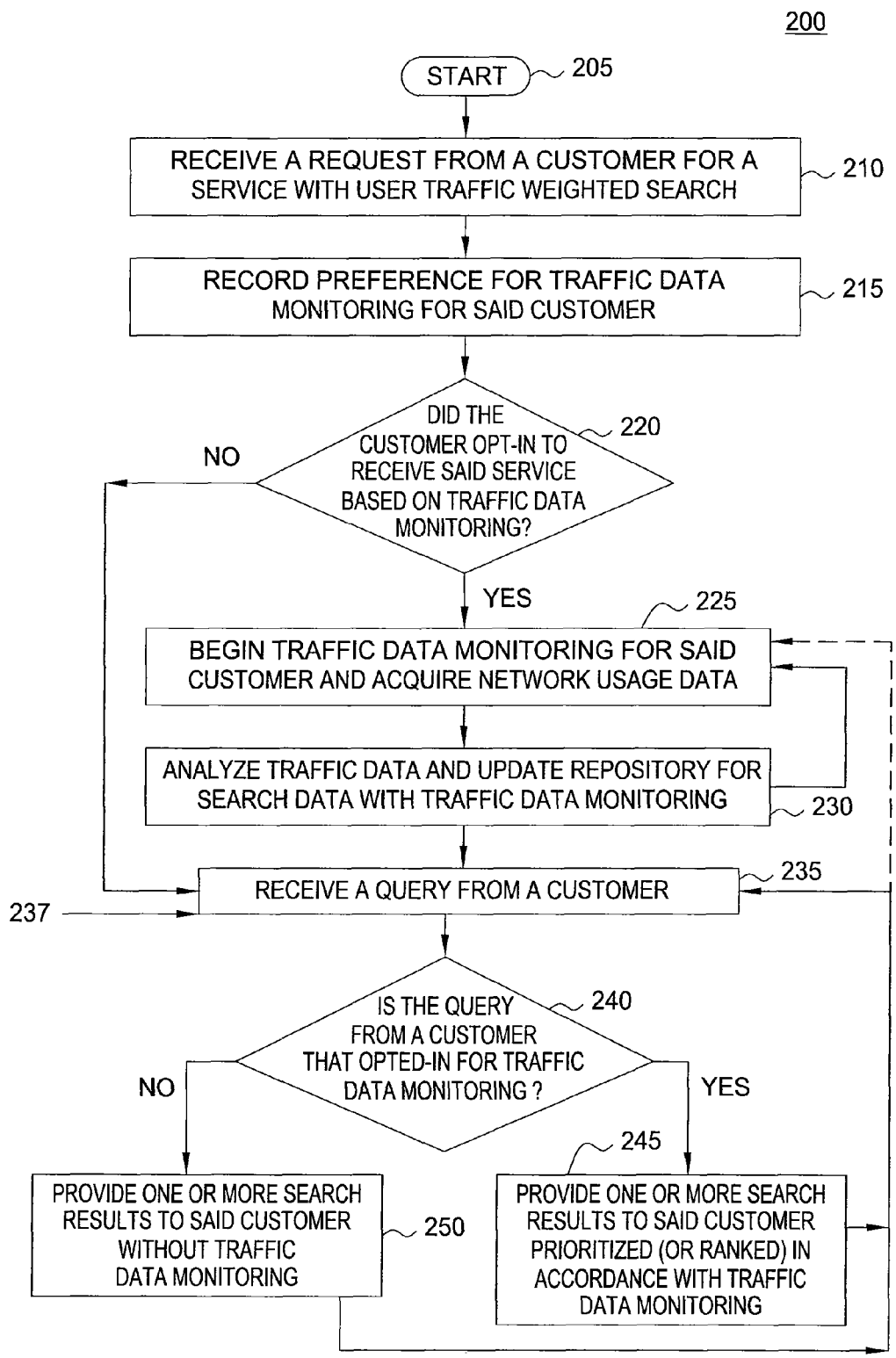
FIG. 2 illustrates a flowchart of one embodiment of a method of the present invention for providing a user traffic weighted search.

FIG. 2 illustrates a flowchart of one embodiment of a method 200 of the present invention for providing a user traffic weighted search. Method 200 starts in step 205 and proceeds to step 210.

In step 210, method 200 receives a request from a customer for a service with user traffic weighted search. For example, a customer may subscribe to a service and provides his/her preference to either opt-in, opt-out or does not care about opting-in or opting-out (ambivalent) of traffic data monitoring.

In one embodiment, it should be noted that content providers (e.g., providers of resources 70) can also be provided with an option to decide whether its traffic will be monitored. For example, a content provider provides its preference to either opt-in, opt-out or does not care about opting-in or opting-out (ambivalent) of traffic data monitoring. For example, a content provider has the option to allow its outgoing traffic to be monitored, not to be monitored, or the content provider simply does not care whether any of its traffic are to be monitored.

In one embodiment, the customer preference and/or the content provider preference can be stored and selectively changed as deemed necessary by the customers or content provider. For example, a customer may generally want its traffic (outgoing and/or incoming traffic) to be monitored. However, if the customer is performing a private financial transaction, it may selectively opt-out of the traffic monitoring for a brief period of time or for a particular transaction and so on. After the sensitive transaction is completed, the customer may opt-in again for traffic monitoring.

In step 215, method 200 records a preference for traffic data monitoring for the customer. For example, if the customer opts-in, the method records the customer's IP address, other identity, etc. in a database for customer traffic data monitoring (e.g., monitoring the customer's general resource accessing activities (e.g., accessing various web sites), monitoring the customer's search queries and the customer's responses to the returned results, and the like). If the customer opts-out, the customer traffic data is not monitored and the customer may receive services using other search methods that do not take into account of traffic usage data.

In step 220, method 200 determines whether or not the customer opted-in to receive the service based on traffic data monitoring. If the customer opted-in, the method proceeds to step 225. Otherwise, the method proceeds to step 235.

In step 225, method 200 begins traffic data monitoring for the customer and acquires network usage data. This data may include relatively low layer (e.g., network or transport layer) information such as number of packets between source and destination, port numbers, and the like, or higher layer information such as URLs retrieved in Hypertext Transfer Protocol "get" operations, and the total size of the information resource retrieved. The traffic data monitor may monitor and maintain data concerning usage of information resources such as web pages on an Internet or Intranet, based on statistics such as frequency of access, number of packets transmitted or blocks accessed, number of packets per user, number of unique users visiting the page, amount of time spent reviewing a page, amount of time spent on the site, etc., either at the block or packet layer, the file or web page layer, the directory or site layer, or combinations thereof. In one embodiment, network usage data is acquired periodically, e.g., at a predefined time period. For example, network usage data may be acquired every 5 minutes, 15 minutes, 30 minutes and so on. The method then proceeds to step 230.

In step 230, method 200 analyzes traffic data and updates repository for search data with traffic data monitoring. For example, the network usage data acquired in step 225 may be analyzed to determine the number of packets coming from a specific source address, the time a user spends at a site, the number of times a web page or other information resource has been viewed, or the like. The repository of network usage data may then be updated. The method then proceeds to step 225 to continue receiving additional network usage data, and/or to step 235 if method 200 receives a query from a customer.

In step 235, method 200 receives a query from a customer. For example, a search engine receives a query for a search. The method then proceeds to step 240.

In step 240, method 200 determines whether or not the query is from a customer that has opted-in for traffic data monitoring. If the customer has opted-in, the method proceeds to step 245. Otherwise, the method proceeds to step 250.

In step 245, method 200 provides one or more search results to the customer prioritized (or ranked) in accordance with traffic data monitoring. For example, the method analyzes the query to determine individual keywords, image characteristics, subsets of locations in a network to search, or the like. The method then generates and provides the customer with ranked search results based on both an analysis of the query and the traffic data monitoring (network usage data). The method then proceeds to step 235 to continue receiving queries or returns to step 225.

In step 250, method 200 provides one or more search results to the customer without traffic data monitoring. For example, the method analyzes the query to determine individual keywords, image characteristics, subsets of locations in a network to search, or the like. The method then generates and provides the customer ranked search results based on analysis of the query and traditional ranking methods, e.g., based on the number of links in a web site. Namely, user usage data will not be used. The method then proceeds to step 235 to continue receiving queries or returns to step 225.

In one embodiment, a customer may opt-in or opt-out of traffic data monitoring by providing a selection in a browser window. For example, an opted-in customer may opt-out of traffic data monitoring while visiting specific resources. For example, a customer may not wish data to be monitored while visiting websites of financial institutions such as banks, brokerages, credit unions, and the like.

In one embodiment, the network service provider may provide various incentives to customers who opt-in for traffic data monitoring. For example, customers who opt-in may receive search results that are prioritized or ranked in accordance with the traffic usage data collected from other customers, while customers who opt-out may only receive search results based on traditional methods. In another example, the network service provider may provide customers who opt-in, a different service level or a different price for one or more services, etc.

In one embodiment, it should be noted that the present invention is not limited to providing the search result in accordance with traffic data monitoring to individuals who are customers who have decided to opt-in or not to opt-in. More specifically, queriers or other users in generally may benefit from user usage data that have been accumulated to refine the other users' search requests.

For example, FIG. 2 illustrates an entry point 237, where an "other" user (e.g., not a customer) who provides a search request. In response to said search request, the method may skip step 240 and proceeds directly to step 245, where the one or more results are provided to said other user prioritized in accordance with traffic data monitoring. As such, the present invention may have broader application than only improving search results of customers.

Note that the various steps of method 200 may occur simultaneously and the above description is not intended to imply a sequential process. For example, method 200 may receive new requests from customers while simultaneously monitoring traffic data, receiving and processing queries, and so on.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 3:
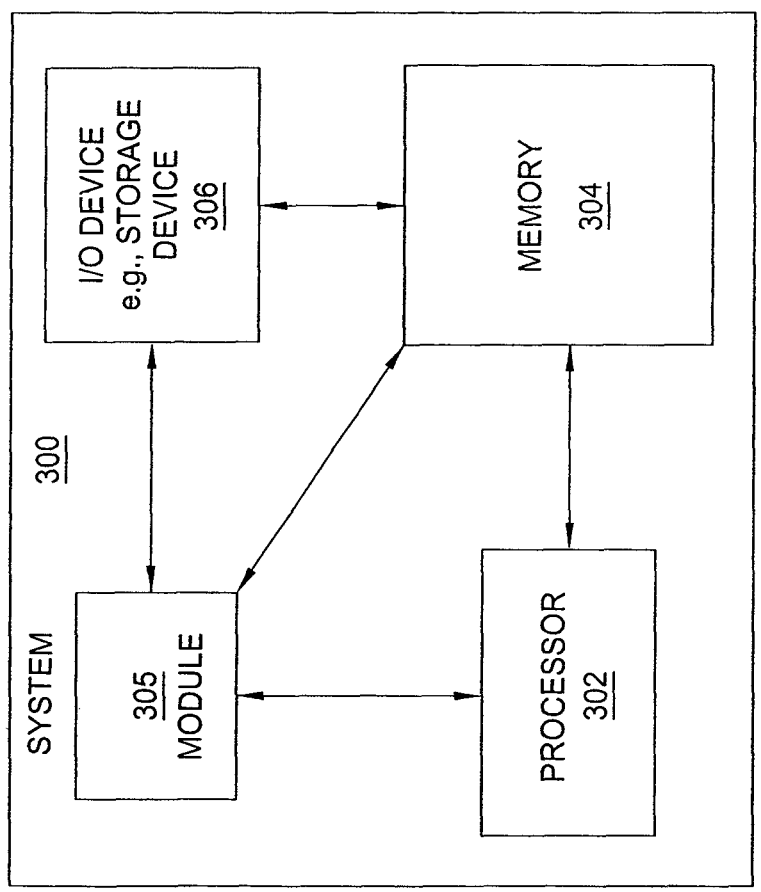
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing user traffic weighted search in networks, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 305 for providing user traffic weighted search in networks can be loaded into memory 304 and executed by processor 302 to implement the functions as discussed above. As such, the present method 305 for providing user traffic weighted search in networks (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a search result in a network, comprising:
   receiving, via a processor, a query from a customer, wherein the query comprises a usage parameter specified by the customer, wherein the usage parameter comprises a parameter associated with an amount of time spent by a visitor visiting a web site, wherein the customer and the visitor are different entities;
   determining, via the processor, whether the customer has opted-in for a service for traffic data monitoring, wherein a network service provider of the service for traffic data monitoring provides an incentive to the customer who has opted-in for the service for traffic data monitoring; and
   providing, via the processor, the search result to the customer in response to the query, where the search result is prioritized in accordance with collected user usage data and the usage parameter specified by the customer when the customer has opted-in for the service for traffic data monitoring.

2. The method of claim 1, further comprising:
   providing a second search result to the customer in response to the query, where the second search result is not prioritized in accordance with the collected user usage data when the customer has opted-out for the service for traffic data monitoring.

3. The method of claim 1, wherein the customer opts-in of the service for traffic data monitoring by providing a selection in a browser window.

4. The method of claim 1, wherein the collected user usage data comprises data associated with accessing activities.

5. The method of claim 1, wherein the incentive comprises a financial incentive.

6. The method of claim 5, wherein the financial incentive comprises a price reduction for a service.

7. A tangible computer-readable medium storing a plurality of instructions which, when executed by a processor, cause the processor to perform operations for providing a search result in a network, the operations comprising:
   receiving a query from a customer, wherein the query comprises a usage parameter specified by the customer, wherein the usage parameter comprises a parameter associated with an amount of time spent by a visitor visiting a web site, wherein the customer and the visitor are different entities;
   determining whether the customer has opted-in for a service for traffic data monitoring, wherein a network service provider of the service for traffic data monitoring provides an incentive to the customer who has opted-in for the service for traffic data monitoring; and
   providing the search result to the customer in response to the query, where the search result is prioritized in accordance with collected user usage data and the usage parameter specified by the customer when the customer has opted-in for the service for traffic data monitoring.

8. The tangible computer-readable medium of claim 7, further comprising:
   providing a second search result to the customer in response to the query, where the second search result is not prioritized in accordance with the collected user usage data when the customer has opted-out for the service for traffic data monitoring.

9. The tangible computer-readable medium of claim 7, wherein the customer opts-in of the service for traffic data monitoring by providing a selection in a browser window.

10. The tangible computer-readable medium of claim 7, wherein the incentive comprises a financial incentive.

11. The tangible computer-readable medium of claim 10, wherein the financial incentive comprises a price reduction for a service.

12. The tangible computer-readable medium of claim 7, wherein the collected user usage data comprises data associated with accessing activities.

13. A method for providing a search result in a network, comprising:
   receiving, via a processor, a query from a user, wherein the query comprises a usage parameter specified by the user, wherein the usage parameter comprises a parameter associated with an amount of time spent by a visitor visiting a web site, wherein the user and the visitor are different entities; and
   providing, via the processor, the search result to the user in response to the query, where the search result is prioritized in accordance with collected user usage data derived from a plurality of other users other than the user who have provided a first preference associated with opting-in for traffic data monitoring and the usage parameter specified by the user, wherein a network service provider provides an incentive to the plurality of other users who have provided the first preference associated with opting-in for traffic data monitoring.

14. The method of claim 13, wherein the first preference comprises a preference by each of the plurality of other users as to whether traffic of each of the other users is to be monitored.

15. The method of claim 14, wherein the traffic comprises outgoing traffic.

16. The method of claim 13, further comprising wherein the search result is prioritized in accordance with collected user usage data derived from a plurality of content providers who have provided a second preference associated with opting in for traffic data monitoring, wherein the second preference comprises a preference by each of the plurality of content providers as to whether traffic of each of the content providers is to be monitored.

17. The method of claim 16, wherein the traffic comprises outgoing traffic.

18. The method of claim 13, wherein the first preference is capable of being selectively changed by one of the plurality of the other users.

* * * * *